United States Patent [19]
Zwillinger

[11] 4,079,724
[45] Mar. 21, 1978

[54] RADIANT ENERGY COLLECTOR PANEL AND SYSTEM

[76] Inventor: Daniel Zwillinger, Laurel La., New Boston, N.H. 03070

[21] Appl. No.: 655,720

[22] Filed: Feb. 6, 1976

[51] Int. Cl.² .............................................. F24J 3/02
[52] U.S. Cl. .................................... 126/270; 126/271; 237/1 A
[58] Field of Search ................. 126/270, 271; 237/1 A

[56] References Cited

U.S. PATENT DOCUMENTS

| | | | |
|---|---|---|---|
| 2,907,318 | 10/1959 | Awot | 126/271 |
| 3,894,685 | 7/1975 | Keyes et al. | 126/270 |
| 3,964,464 | 6/1976 | Hockman | 126/271 |
| 3,974,824 | 8/1976 | Smith | 126/271 |
| 3,980,071 | 9/1976 | Barber, Jr. | 126/271 |
| 3,982,527 | 9/1976 | Cheng | 126/271 |

FOREIGN PATENT DOCUMENTS

| | | | |
|---|---|---|---|
| 814,875 | 3/1937 | France | 126/270 |

*Primary Examiner*—Kenneth W. Sprague
*Attorney, Agent, or Firm*—Wallenstein, Spangenberg, Hattis & Strampel

[57] ABSTRACT

A radiant energy collector panel comprises a plurality of outwardly facing open ended channels extending inwardly from the outer face of the panel for receiving radiant energy directed at the outer face of the panel wherein each channel includes an inwardly extending concave interface surface and an opposed inwardly extending convex interface surface. The opposed inwardly extending concave and convex interface surfaces provide increased areas exposed to the radiant energy, absorb and substantially reflect and amplify radiant energy of larger angle of incidence inwardly to the inner portion of the channel, substantially absorb radiant energy of smaller angle of incidence of the primary and reflected radiant energy, and reabsorb reradiated energy of lower spectral frequency therefrom, to provide a collector panel of relatively high efficiency. Various forms of such collector panels are disclosed. The radiant energy collector panel may be arranged inside an essentially slanted heat exchange passage and insulating space connected by upper and lower horizontal ducts to a substantially vertically arranged heat storage passage containing a heat storing medium. A heat transfer medium, such as air, gravity circulates through the passages and ducts absorbing heat from the collector panel in the heat exchanging passage and heating the heat storing medium in the heat storage passage.

32 Claims, 10 Drawing Figures

RADIANT ENERGY COLLECTOR PANEL AND SYSTEM

This invention relates to radiant energy collector panels for receiving radiant energy, such as solar energy, and converting the same to another form of energy, such as dissipated heat, electricity or the like, and to a radiant energy heating system employing such panels.

In general, some prior radiant or solar heat collector systems have utilized absorber panels having a black finish, granular surfaces or the like for maximum solar energy absorption, across which a fluid, such as water, flows to absorb the heat generated by the solar energy in the panels. However, such absorbing panels are also good radiators and they and the fluid passing thereacross act to radiate heat back into space and materially reduce the efficiency of the systems. In order to increase the efficiency of such systems, several special transparent or translucent shields have been placed thereover, over and above the necessary shields for convection, which pass solar energy to the panels and absorb and reradiate at lower spectral frequency or reflect back radiation of heat from the panels and the fluid. However, these panels also decrease somewhat the solar energy reaching the panels and the fluid, and add cost.

In other radiant or solar heat collector systems, reflecting surfaces have been utilized for reflecting and concentrating the solar energy on solar energy absorbing (black body) devices to be heated therby, such as conduits containing a fluid, photovoltaic devices or the like, which are also exposed and radiate heat back into space with a material reduction in efficiency. These systems also have been provided with additional special transparent or translucent shields, as aforesaid, to decrease such reradiation of heat to space, and they may require tracking.

A principal object of this invention is to provide an improved radiant energy collector panel for receiving radiant energy, which has high efficiency in converting radiant energy, such as solar energy, into another form of energy, such as dissipated heat, electricity or the like, which substantially reduces reradiation of heat back into space, which provides increased surface areas exposed to the radiant energy, which reflects and amplifies the radiant energy, which can efficiently utilize a gas, such as air, as the heat absorbing fluid, which is relatively inexpensive to manufacture and install, which is rugged in construction and fool-proof in operation, and which may utilize but not require tracking.

Briefly, in accordance with this invention, there is provided a radiant energy collector panel including a plurality of outwardly facing open ended channels which extend inwardly from the outer face of the panel for receiving radiant energy, such as solar energy, directed at the outer face of the panel. Each of said channels comprises an inwardly extending concave interface surface and an opposed inwardly extending convex interface surface.

The opposed inwardly extending concave and convex interface surfaces of the channels provide increased areas exposed to the radiant energy, in a practical application substantially four times that of a plane panel. They partly absorb and substantially reflect and amplify radiant energy of larger angle of incidence to these surfaces, specular and diffused, such as incident sun radiation, inwardly to the inner portion of the channel where it meets the surfaces with a smaller angle of incidence so as to be more completely absorbed thereat. Radiant energy of smaller angle of incidence to these surfaces, such as is part of incident diffused light, is also efficiently absorbed in the channels of the collector panel. Reradiated heat energy of lower spectral frequency, is also reabsorbed in the channels of the collector panel and substantially no heat energy is reradiated or reflected out into space. As a result, the opposed inwardly extending concave and convex interface surfaces of the channels in the radiant energy collector panel provide for extremely efficient collection of radiant energy, efficient distribution of absorbed energy in the panel and minimum reradiation of energy back into space.

Preferably, the inwardly extending concave interface surface corresponds substantially to a spiral curve and joins with the inwardly extending convex interface surface at an end thereof which is close to the centroid of the spiral curve. The inwardly extending concave interface surface of the channel encompasses a plurality of concave tangential quadrants of conical section curves, as for example quadrants of elipses, each having a focal point arranged along a concave focal point curve. The inwardly extending convex interface surface substantially corresponds to and is inwardly confined by the concave focal point curve. Thus, maximum inward reflection and amplification of the radiant energy and ultimate absorption thereof, with little diffusion and minimum reradiation of energy back into space, are effectively provided.

The inwardly extending open ended channels in the collector panel may be linear and arranged in parallel and the panel may comprise extruded or pulltruded sections or a plurality of interconnected strips providing the channels therebetween. Alternatively, the channels may be curved and arranged laterally in the panel and the panel may comprise a plurality of prefabricated sheets secured together. Also, the panel may comprise combinations of channels of different cross sectional shapes arranged in channel groups in the panel.

A radiant energy transmitting cover may be provided over the outer face of the radiant energy collector panel and the outwardly facing open ended channels therein for transmitting radiant energy thereto and for protecting the same from the surrounding elements. Since reradiation of energy back into space from the radiant energy collector panel of the invention is effectively minimized, the cover may consist of the minimum number of layers required to shield it against convection losses and need not be of the special type which reflects back reradiated energy as has been heretofore needed, although the latter may be utilized if so desired. The cover is preferably spaced from the radiant energy collector panel to eliminate conduction of heat from the panel to the cover to avoid that form of heat loss. In some instances the cover is closely adjacent the outer face of the panel and in others the cover is spaced sufficiently to provide a substantial air passage between it and the panel. Selective coating of the outward facing collector panel surfaces that efficiently absorbs incident radiation and reduces reradiation at a lower spectral frequency, although applicable, is not required especially in its more effective and costly form, due to the inherent geometric reduction of reradiation outward from the panel.

Means are also provided for absorbing heat generated in the panel by the radiant energy and the absorption of heat from the panel may take place adjacent the inner face of the panel and/or adjacent the outer face of the panel. With respect to the absorption of heat adjacent the inner face of the panel, the panel may be provided with conduits containing a heat absorbing fluid, such as a liquid, for absorbing the generated heat. The conduits may be in the panel or at the inner face of the panel. In this same respect, the inner face of the panel amy be provided with fins projecting into a heat exchange passage containing a heat absorbing fluid, such as a gas or air, for absorbing the generated heat. Since such absorption of heat is usually not adjacent to the outer face or irradiated side of the panel, there is no reradiation of heat from the heat absorbing fluid, conduits or fins back into space, thereby providing further increase in efficiency.

With respect to the absorption of heat adjacent the outer face of the panel, the heat absorbing means includes a heat exchange passage between the panel and the radiant energy transmitting cover having a circulating heat absorbing fluid, such as a gas or air, for absorbing the heat generated in the panel by the radiant energy. The panel portions forming the channels therein operate as heat convecting fins for heating the circulating heat absorbing fluid in the heat exchange passage. Preferably, the spacing between the cover and the outer face of the panel is such that possible fluid turbulence between the cover and the panel is minimal and restricted to the interior of the channels of the panel, thereby providing a smooth flow of heat absorbing fluid, with low heat loss into the cover, over the panel. If the cover is spaced a substantial distance from the outer face of the panel, and no heat absorbing fluid is used there, an additional radiant energy transmitting membrane may be located closely adjacent the outer face of the panel to seal the same against foreign matter.

The radiant energy collector panel of this invention is ideally suitable for use with a heat absorbing fluid, such as a gas or air, for absorbing heat generated in the panel by the radiant energy collected by the panel thereby providing for inexpensive construction and installation costs, rugged, durable and fool-proof construction and operation, and efficient radiant energy collection and conversion to other energy, such as dissipated heat energy which is also efficiently absorbed by the fluid. The fact that the panel convection fins can be applied to the back of the panel, allows sufficient design freedom to shape them for the best amount of turbulence in the absorbing fluid to maximise heat exchange into it over the desired flowrate range of the fluid.

In another form of this invention, the radiant energy collected by the radiant energy collector panel is converted directly to electrical energy. This is accomplished by locating photovoltaic devices or the like at the inner ends of the channels of the panel so that the radiant energy which is collected and amplified by the panel, as discussed above, is applied to the photovoltaic devices or the like for the direct generation of electrical energy.

Another principal object of this invention is to provide an improved radiant energy heating system utilizing the radiant energy collector panel of this invention and a system having a heat transfer fluid which is gravity circulated through the system.

In this connection, the system includes a collector panel inside an essentially slanting heat exchange passage having a radiant energy transmitting cover directed toward a source of radiant energy, a substantially vertically arranged heat storage passage, a substantially horizontally arranged upper duct interconnecting the upper ends of the heat exchange and heat storage passages and a substantially horizontally arranged lower duct interconnecting the lower ends of the heat storage and heat exchange passages. The passages and ducts contain a circulating heat transfer fluid, such as air. A radiant energy collector panel is located in the heat exchange passage for receiving radiant energy from the source of radiant energy for generating heat therefrom to heat the heat transfer fluid in the heat exchange passage by heat absorption therein. A heat storing medium is located in the heat storage passage for absorbing heat from the heat transfer fluid in the heat storage passage for storing heat in the heat storing medium and cooling the heat transfer fluid thereby. The heating of the heat transfer fluid in the heat exchange passage and the cooling of the heat transfer fluid in the heat storage passage causes gravity circulation of the heat transfer fluid through the passages and ducts, thus diminishing or eliminating the need for forced circulation thereof.

A further set of advantages of this invention lies in the fact that it lends itself to superimposed combinations of heat conversions permitting any set of combinations of the following:

Outer panel face heat absorption into a fluid under favorable outer element and high panel temperature conditions.

Heat byproduct absorption when electric energy is generated. Also serves to reduce photovoltaics' thermal stress and improve performance.

Gas and liquid fluid combinations as for example direct ambient heating with air, utility water heating, water or antifreeze heating for heat storage, freon heating for use with a heat pump, thermally expanding fluid heating to energize cooling apparatus, electric energy generation.

Independent starting and stopping capability of above exchanges.

Further objects of this invention reside in the construction of the radiant energy collector panels and the radiant energy heating system and in the cooperative relationship between the component parts thereof.

Other objects and advantages of this invention will become apparent to those skilled in the art upon reference to the accompanying specification, claims and drawings, in which:

Figure 1:
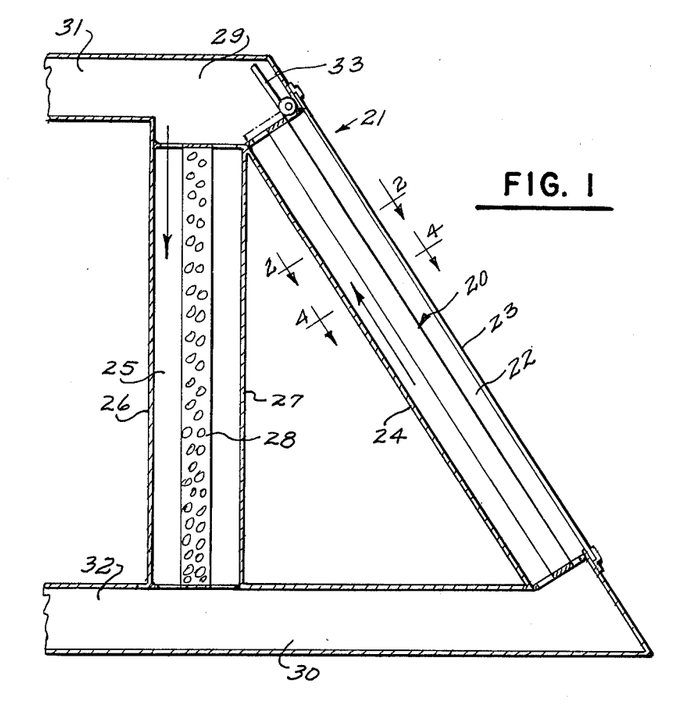
FIG. 1 is a diagrammatic vertical section view of a radiant energy heating system which may incorporate a radiant energy collector panel as disclosed herein.

The radiant energy collector panel of this invention is generally designated at 20 (20A - 20E) and it is disclosed as being incorporated in a radiant energy heating system generally designated at 21 in FIG. 1. The radiant energy heating system 21 includes an essentially slanting heat exchange passage 22 having a radiant energy transmitting cover 23 directed toward a source of radiation, such as the sun. The passage 22 is also confined by a wall 24 which is preferably insulated against heat loss. The radiant energy collector panel 20 is suitably located in the heat exchange passage 22. The channels, ducts or ribs of the collector panel 20, unless they are curved, are hereinafter described to be essentially vertical for simplicity's sake, but need not always be so. The slant of the heat absorbing passage 22 and the radiant energy collector panel 20 is such as to obtain maximum exposure to the radiant energy and this depends, for the case of solar radiation, upon the latitude of the earth where the system is to be installed. As a general rule of thumb, the angle of the slant from the horizontal is usually the angle of latitude plus 15° (decreasing to zero near the equator and pole regions). The radiant energy heating system also includes a substantially vertically arranged heat storage passage 25 which is defined by walls 26 and 27 which are also preferably insulated against heat loss. A heat storing medium 28 is located in the heat storage passage 25 for absorbing heat in that passage. The heat storage medium 28 is a heat absorbing and conducting medium and may comprise water in tubes, eutectic salt solution in bags or trays, metallic masses, stones or concrete, molasses in finned conduits, or the like.

The upper ends of the heat exchange passage 22 and the heat storage passage 25 are interconnected by a substantially horizontally arranged upper duct 29 and, likewise, a substantially horizontally arranged lower duct 30 interconnects the lower ends of the heat storage passage 25 and the heat exchange passage 22. The passages 22 and 25 and the ducts 29 and 30 contain a circulating heat transfer fluid, such as air.

The radiant energy collector panel 20 receives radiant energy from the source of the radiant energy for generating heat therefrom to heat the heat transfer fluid in the heat exchange passage 22 by heat absorption therefrom. The heat storing medium 28 in the heat storage passage 25 absorbs heat from the heat transfer fluid therein for storing heat in the heat storing medium and cooling the heat transfer fluid in the heat storage passage 25. The heating of the heat transfer fluid in the heat exchange passage 22 and the cooling of the heat transfer fluid in the heat storage passage 25 cause gravity circulation of the heat transfer fluid through the passages 22 and 25 and the ducts 29 and 30 without the need for forced circulation of the heat transfer fluid. The circulation of the heat transfer fluid through the heat exchange passage 22 may be controlled and regulated, such as by a damper 33.

The horizontal ducts 29 and 30 of the heating system 21 are provided with a supply conduit 31 and a return conduit 32 for supplying heated air to a space or space or supplementary storage to be heated and to return cooled air therefrom. When the source of radiation energy decreases to such a value that the heat transfer fluid is no longer heated in the heat exchange passage 22, the damper 33 may be closed to cut off circulation through the heat exchange passage 22 and allow gravity circulation of the heat transfer fluid from heat storage passage 25 where it is heated by the heat storing medium 28, through the supply conduit 31 to the space or spaces or supplementary storage to be heated and to be returned therefrom through the return conduit 32 to the heat storage passage 25 to again be reheated by the heat storing medium. The conduits 31 and/or 32 may be provided with suitable dampers (not shown) for regulating the circulation of air to and from several spaces and supplementary storage to be heated. Additional dampers like 33 may be provided to outwardly exhaust air from the heat exchange passage 22, to bypass the heat storage passage 25. Similarly, additional, regulated, partial or complete bypass passages (not shown) to storage passage 25, may be provided to control thermal storage stratification.

Figure 2:
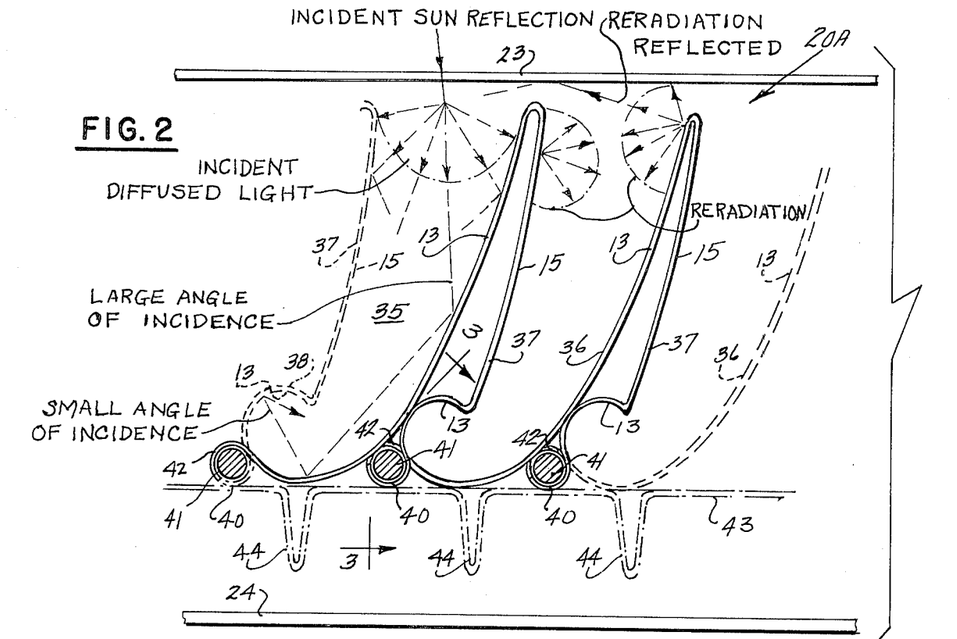
FIG. 2 is a substantially horizontal partial sectional view through one form of the radiant energy collector panel of this invention taken substantially along the line 2—2 of FIG. 1.

One form of the radiant energy collector panel 20 of this invention is generally designated at 20A in FIG. 2. The panel includes a plurality of outwardly facing open ended channels 35 extending inwardly from the outer face of the panel for receiving radiant energy directed at the outer face of the panel. Each channel 35 comprises an inwardly extending concave interface surface 13 and an opposing inwardly extending convex interface surface 15 spaced from the concave interface surface 13. The outer portions of the concave and convex interface surfaces 13 and 15 are substantially perpendicular to the outer face of the panel 20A and are smooth and reflective to light impinging at a higher angle of incidence there to minimize outward diffusion of the radiant energy striking there. The inwardly extending concave interface surface 13 corresponds substantially to a spiral curve and the inwardly extending convex interface surface 15 and the inwardly extending concave interface surface 13 are joined at the ends thereof which are closer to the centroid of the spiral.

Figure 6:
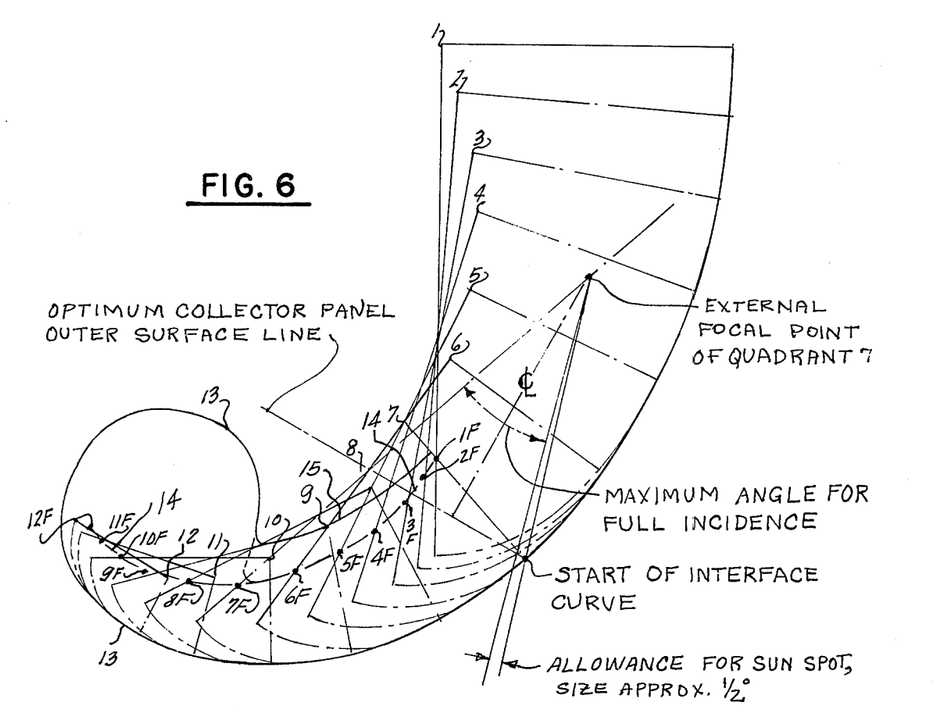
FIG. 6 is a diagrammatic layout illustrating the manner of generating the concave and convex interface surfaces of the channels of the various forms of the radiant energy collector panels illustrated in FIGS. 2 to 5 and also in FIGS. 7 to 10.

As illustrated in FIG. 6, the inwardly extending concave reflector surface 13 corresponding to the spiral curve encompasses a plurality of faired concave tangential quadrants of conical section curves 1 to 12 each having a focal point 1F to 12F arranged along a concave focal point curve 14. As illustrated, the concave tangential quadrants 1 - 12 of conical section curves are substantially quadrants of ellipses. Radiant energy received by the concave surface 13, at various points therealong corresponding to the tangential quadrants of the conical section curves, may be partly absorbed there and reflected to substantially the focal points 1F to 12F of the quadrants 1 to 12, which focal points fall along a focal point curve 14 and, as a result, the reflected radiant energy may also be further partly absorbed and amplified and concentrated along the focal point curve 14. The convex interface surface may correspond to the focal point curve 14 and may join with the concave interface surface 13 as indicated in dotted lines in FIG. 6. On the other hand, the convex interface surface may be backed off from the concave focal point curve 14 to provide a convex interface surface designated at 15 in FIG. 6. This convex interface surface 15 substantially corresponds to the concave focal point curve 14 and is inwardly confined by the concave focal point curve 14. The location of the convex interface surface 15 at the concave focal point curve 14 or the spacing thereof from the focal point curve 14 assures that there is no interruption to the radiant energy reflected inwardly by the concave interface surface 13, but with a slight loss in amplification as compared to focal point curve 14. Additional reflections will occur as radiant energy is further bounced back between curve 14 and 15 and curve 13, and each time a portion of the radiant energy may get absorbed in the surfaces of curves 14 or 15 and 13.

Also, as illustrated in FIG. 6, the start of the concave interface surface may begin at the minor axis vortex of the concave tangential quadrant 7 of the conical section curves and radiant energy from the external focal point of quadrant 7 will begin to be absorbed and reflected by the concave interface surface 13 through the internal focal point 7F of the focal point curve 14 and will be more completely absorbed in the inner portion of the channel 35. FIG. 6 illustrates the maximum angle for full incidence for such radiant energy and illustrates an allowance or approximately $\frac{1}{4}°$ for sun spot size, and optimum collector outer surface line. Specular radiation impinging from outside the specified maximum angle for full incidence may be subject to the undersirable possibility of becoming reflected back out from the panel after two or three reflections, thus not reaching the inner portion of the channels where final absorption could take place. To eliminate or minimize this possibility appropriate choices of maximum angle for full incidence and optimum collector outer surface line have been made. The choice of angle is derived from reflection laws of conical section surfaces and respective focal points as discussed above. The optimum collector outer surface line as shown in FIG. 6 is chosen in a median position for a given angular spread of impinging specular radiation but other choices could be made to best suit a particular application. Specifically, the optimum collector outer surface line is shown to extend from minor axis vortex of the concave tangential quadrant 7 of that conical section curve and to be at right angles to a centerline bisecting the maximum angle for full incidence.

Referring again to FIG. 2 and particularly the left hand portion thereof, the incident specular sun radiation has a large angle of incidence where it impinges the concave interface surface 13 and is substantially reflected into the inner portion of the channel 35 to again impinge the concave interface surface 13 with a smaller angle of incidence. High reflection with minimum diffusion and low absorption is obtained with large angles of incidence while higher absorption is obtained with smaller angles of incidence. As a result, the radiant energy is amplified and directed to the inner portion of the channel 35 and is efficiently absorbed in the inner portion of the channel 35 where a slight increase in reflection diffusion occurs in a semi-enclosed space for subsequent reabsorption. The incident sun radiation also provides a large proportion of incident diffused light as illustrated in the left hand portion of FIG. 2 and most of this incident diffused light is also directed inwardly toward the inner portion of the channel 35 by the concave interface surface 13 and the convex interface surface 15. Any portion of the incident diffused light that might have been reflected back out again by an interface surface would have impinged the panel cover at such a large angle of incidence to it so as to be reflected away thereat. Generally also, two to three reflections of diffused light radiation components will suffice to substantially absorb same.

Reradiation of heat from an interface surface 13 or 15 is substantially in a direction facing the other interface surface, since the interface surfaces 13 and 15 are opposed to each other and do not face substantially directly outwardly, and there is substantially no reradiation of heat from these surfaces out into space. Smoother reflector surfaces and lower temperatures at the outer portions of the interface surfaces 13 and 15 limits any substantial diffusion of the energy therefrom and most of the stray reradiation from such surfaces strikes the cover 23 with a large angle of incidence and is reflected back into the panel by the cover 23, as illustrated in the central portion of FIG. 2. Likewise, reradiation from and between the opposed reflector surfaces 13 and 15 further inward is readily reabsorbed in the channel 35, as illustrated in the central portion of FIG. 2. An interface surface morphology that is conducive to absorption of the high specular energy, but appears smooth to the lower, specular, reradiated energy will reduce excessive large angle of incidence diffusion of same and related losses.

Thus the opposed inwardly extending concave and convex interface surfaces 13 and 15 of the channels 35 provide increased areas exposed to the radiant energy, reflect and amplify inwardly to the inner portion of the channels 35 major portions of the radiant energy of large angle of incidence to the interface surfaces, which includes most of the incident specular high spectral radiation and much of the incident diffused radiation, absorb radiant energy of smaller angle of incidence whether afforded by reflected incident, high spectral specular radiation or incident diffused high spectral radiation, reabsorbs low spectral energy reradiated therefrom, and substantially prevents loss of radiated energy from the panel 20A towards space.

Figure 3:
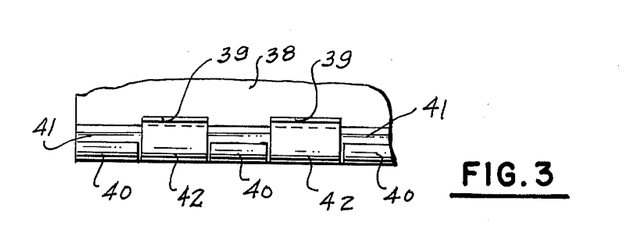
FIG. 3 is a partial view of a portion of the radiant energy collector panel of FIG. 2 taken substantially along the line 3—3 of FIG. 2.

The specific form of the radiant energy collector panel 20A, as illustrated in FIGS. 2 and 3, has a plurality of open ended channels 35 which are linear and arranged in parallel in the panel. The panel comprises a plurality of interconnected preformed strips, such as metal strips, providing the channels 35 therebetween. Each preformed strip includes a concave portion 36 forming a large portion of the concave interface surface 13 merging at the outer face of the panel into a convex portion 37 forming the convex interface surface 15 which in turn merges at the inner end thereof into a concave portion 38 forming a small portion of the concave interface surface 13. The inner ends of the concave portions 38 of the strips are provided with a plurality of notches 39 and tongues 40 therebetween which are received beneath and around supporting rods or tubes 41. The inner ends of the concave portions 36 of the strips also have a plurality of tongues 42 which extend through the notches 39 and are received over and around the supporting rods or tubes 41. In this way the preformed strips are interconnected and secured to the rods or tubes 41 to form the radiant energy collector panel 20A having the open ended channels 35 which include the concave and convex interface surfaces 13 and 15.

The rods or tubes 41 may be suitably anchored to anchor and position the radiant energy collector panel 20A in any desired position, for example, in the heat exchanging passage 22 of FIG. 1 in conjunction with the radiant energy transmitting cover 23 and the insulated wall 24. The radiant energy collector panel 20A may be made of any desired length by appropriately selecting the lengths of the supporting rods or tubes 41 and of the interconnected preformed strips providing the channels 35 therebetween, and it may be of any desired width by appropriately selecting the number of supporting rods or tubes 41 and interconnected preformed strips. A plurality of such radiant energy collector panels 20A may be arranged side by side and/or end to end with appropriate expansion joints and pipe fittings as needed, to form a large or extended radiant energy collector panel to be subjected to the radiant energy.

The radiant energy, particularly where it has a small angle of incidence with the interface surfaces 13 and 15 of the channels 35, is converted into heat energy and heats the preformed strips forming the channels 35 of the panel 20A. The heat may be absorbed from the panel in a number of ways. Where the supporting rods or tubes 41 are tubes or conduits, a heat absorbing fluid, such as a liquid or the like, may be circulated through the tubes or conduits 41 to absorb the heat from the panel and convey the absorbed heat away for use. The heat is transferred principally by conduction from the interface surfaces 13 and 15 to the tubes or conduits 41 and thence by conduction, and/or some radiation and convection to the heat absorbing fluid therein.

In another way, a heat absorbing fluid, such as a gas or air or the like, may be circulated through the channels 35 in the radiant energy collector panel 20A to absorb the heat from the panel and convey the absorbed heat away for use. In this respect, the interface surfaces 13 and 15 act as heat exchanging fins for heating absorbing fluid. Here, the circulation of the heat absorbing fluid is confined by the radiant energy transmitting cover 23 and, as expressed above, the spacing between the cover 23 and the outer surface of the panel 20A should be such as not to cause turbulence in the circulating heat absorbing fluid against the cover or excessively so in the channels 35 in the panel. The heat is transferred by convection from the channels 35 to the circulating heat absorbing fluid.

In a further and preferred way, the panel may be provided with a heat absorbing and conducting plate 43, made of metal or the like, secured in heat transferring relation to the preformed strips on the inner or non-irradiated or dark side of the panel 20A. This plate 43 is provided with heat transferring fins 44 extending into a heat exchanging passage bounded by a heat insulated wall 24 along which a heat absorbing fluid, such as a gas, air or the like, is circulated. The heat absorbing fluid is heated by the plate 43 and fins 44 by some radiation and by convection. Since the heat absorption takes place on the dark side of the panel 20A, there is no reradiation of heat from there back out into space and complete design freedom to optimise the convection with regard to fluid turbulence exists, so a very efficient system is provided. Another important feature that should not be overlooked here is that a heating up gas rises due to gravity and creates a slight pressure increase at the boundary with the lower face of a slanted panel above it. The pressure increase contributes favorably to an increase in heat absorption efficiency from the lower face of the slanted panel as may be the case in a solar collection system of the preferred design at hand. The opposite effect exists when absorption occurs from the higher face of a slanted collector panel.

These various ways of absorbing heat from the panel 20A may be individually used as desired or they may be used in combination as desired, this depending principally upon atmospheric conditions involved, such as outside temperature, amount and nature of the radiant energy, sunny or cloudy conditions and the like.

In addition to being heat absorbing and heat conducting, the preformed strips forming the channels 35 of the panel 20A should also be smooth, particularly adjacent the outer portions thereof, for proportionally reflecting inwardly radiant energy of large angle of incidence and minimizing diffusion thereof. In this respect, the preformed strips, which may be made of steel, copper, aluminum or the like, may be polished and provided with radiation absorbing, even selective coatings, such as by plating with and/or oxidizing steel, copper, nickel, chromium, and the like or by anodizing preferably dark or the like. Non-metallic coatings transparent to the lower spectral reradiation may also be used. Paints are not recommended as yet, due to their high diffusion properties.

Figure 4:
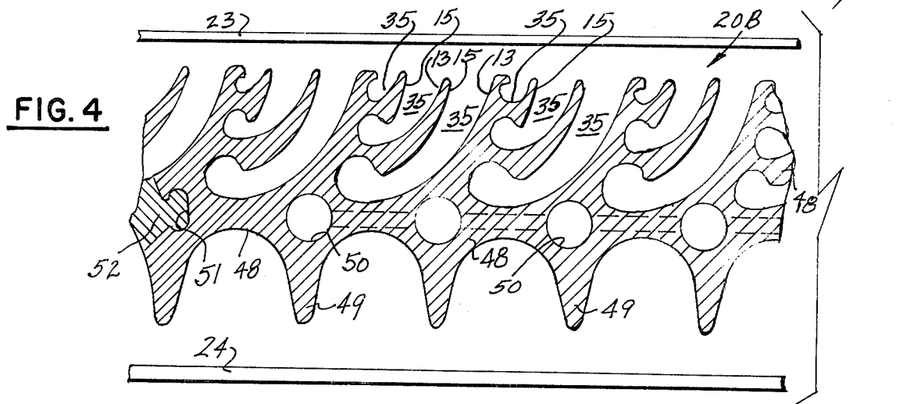
FIG. 4 is a substantially horizontal sectional view similar to FIG. 2 but illustrating another form of the radiant energy collector panel of this invention and taken substantially along the line 4—4 of FIG. 1.

Another form of the radiant energy collector panel of this invention having a plurality of linear channels arranged in parallel in the panel is generally designated at 20B in FIG. 4. Here the panel 20B comprises an extruded or pulltruded section 48, hereinafter only referred to as extruded. The extruded section 48 may be a metallic section such as aluminum or the like. In extruding the section it is provied with a plurality of parallelly arranged open ended channels 35 each including a concave interface surface 13 and a convex interface surface 15, like the channels discussed above. The parallel open ended channels 35 are arranged in groups having a large channel, an intermediate size channel and a small channel, all opening outwardly at the outer face of the panel. The groups of channels are arranged in parallel with similar groups of channels throughout the width of the panel.

The extrusion panel 20B can also have on its inner face a plurality of fins 49. The panel may also have a plurality of conduits 50 therein through which a heat absorbing fluid, such as a liquid or the like, may be circulated for absorbing heat from the panel. These conduits 50 may be interconnected by conduits and fittings at the ends of the panel and by holes drilled partway through the extrusion ends. Each extrusion 48 may be provided with a recess 51 and a projection 52. The recesses 51 of the extrusions receive the projections 52 of adjacent extrusions to lock together a plurality of extrusions to form a composite panel of any desired width. The length of the individual panel is determined by the length of the extrusion. These may further be appropriately spliced to form larger panel combinations.

The heat generated in the panel 20B by the radiant energy in the manner discussed above may be absorbed in a number of ways. In one way the heat may be absorbed by a heat absorbing fluid, such as a liquid or the like, circulating through the conduits 50. In another way, a heat absorbing fluid, such as a gas or air or the like, may be circulated through the channels 35 to absorb the heat from the panel and convey the absorbed heat away for use. In this respect, the interface surfaces 13 and 15 of the groups of channels 35 act as heat convecting fins for heating the heat absorbing fluid. Here also, the circulating of the heat absorbing fluid is confined by the radiant energy transmitting cover 23 and, as expressed above, the spacing between the cover 23 and the outer surface of the panel 20B should be such as to maintain the best balance of turbulence in the circulating heat absorbing fluid. By utilizing a plurality of channels 35 arranged in groups, a maximum surface area is provided for receiving the radiant energy and for heating the circulating heat absorbing fluid so as to provide maximum efficiency.

In a further way, the transfer fins 49 extend into a heat exchanging passage bounded by the inner face of the panel 20B and a heat insulated wall 24 along which a heat absorbing fluid, such as a gas, air or the like, is circulated. The heat absorbing fluid is heated by the fins 49 mostly by convection. Since the heat absorption takes place on the dark side of the panel 20B there is no reradiation of heat from the heat absorbing fluid or fins back into space and again freedom of design, exists to optimise convection there, so also a very efficient system is therefore provided. Here, also, an increase in heat absorption efficiency from the lower and inner face of a slanted panel is provided as expressed above in connection with the panel 20A in FIGS. 2 and 3.

Here again, these various ways of absorbing heat from the panel 20B may be individually used as desired or they may be used in combination as desired, this depending principally upon atmospheric conditions involved as expressed above in connection with the radiant energy collecting panel 20A of FIGS. 2 and 3.

In addition to being heat absorbing and heat conducting, the extrusion 48 forming the panels 35 of the panel 20B should also be smooth, particularly adjacent the outer portions thereof, for proportionally reflecting inwardly radiant energy of large angle of incidence and minimizing diffusion thereof. In this respect, the channels 35 in the extrusion 48, which is preferably an aluminum extrusion, are anodized to provide the smooth preferably dark surfaces 13 and 15 in the channel. If desired, the interface surfaces 13 and 15, particularly at the outer portions thereof, may be further polished to improve the reflecting characteristics thereof. The extrusion can also be a plated glass or glass filled polyesther pulltrusion or the like. It could also be plated with copper and oxydized for added spectral selectivity.

Figure 5:
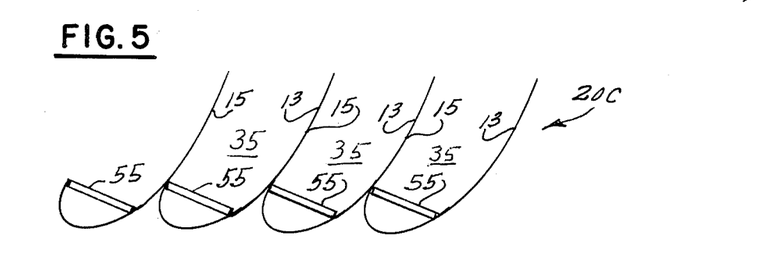
FIG. 5 is a diagrammatic substantially horizontal view of another form of the radiant energy collector panel of this invention which operates to generate directly electrical energy from the radiant energy.

In another form of the radiant energy collector panel generally designated at 20C in FIG. 5 and having a plurality of channels 35 each provided with a concave interface surface 13 and a convex interface surface 15, the radiant energy is absorbed by photovoltaic substrates or devices 55 arranged at the inner ends of the panels 35 for the purposes of directly generating electricity from the radiant energy. Here, the interface surfaces 13 and 15 amplify and direct the radiant energy onto the photovoltaic substrates and also operate to minimize reradiation of energy back out into space as discussed above in connection with the other forms of this invention. The photovoltaic substrates 55 for converting radiant energy into electricity are known in the art and, accordingly, further description thereof is not considered necessary. Any of the earlier described panel designs or similar designs may be used here and it is noted from FIG. 5 that a portion of the interface surface can also be utilized to provide back radiation onto substrate by reflection thereof. If, as in the case of internally provided photovoltaic substrates or devices or other forms of energy conversion, where the principal function to be formed in the channels 35 is amplification and concentration of radiated energy or heat, then unlike as heretofore emphasized the interface surfaces should be made highly polished and reflective and possible plating with precious metals or clear anodizing applied.

Figure 7:
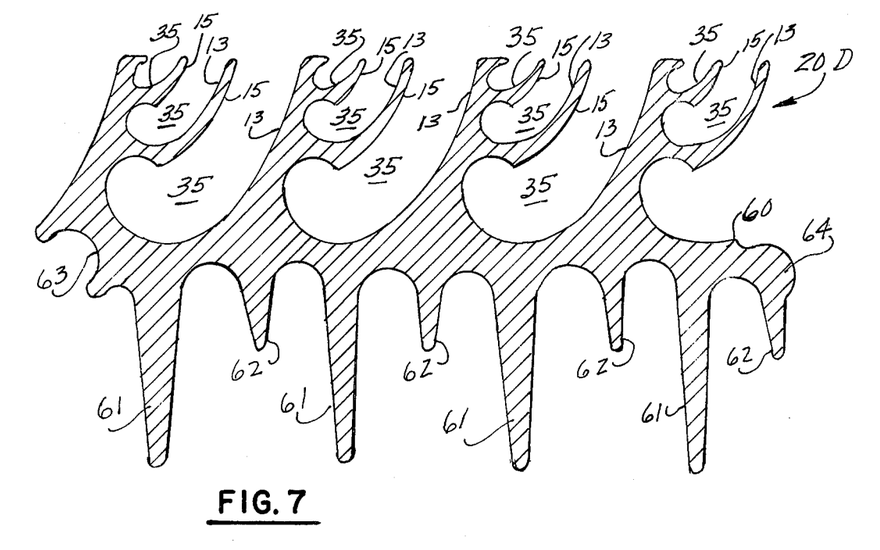
FIG. 7 is a substantially horizontal sectional view through still another form of the radiant energy collector panel of this invention which is somewhat similar to the form of the radiant energy collector panel of FIG. 4.

A further form of the radiant energy collector panel of this invention is generally designated to 20D in FIG. 7. It includes an extrusion 60 having a plurality of groups of open ended channels 35 each having a concave interface surface 13 and a convex interface surface 15. The extrusion 60 also has a plurality of transfer fins 61 and 62 and the extrusions 60 are provided with a recess 63 and a projection 64 for securing together adjacent sections to form a large radiant energy collector panel. In these respects, the radiant energy collector panel 20D is very much like the radiant energy collector panel 20B of FIG. 4 as discussed above and what has been said there applies essentially to the radiant energy reflector panel 20D of FIG. 7. The radiant energy collector panel 20D of FIG. 7 basically differs from the radiant energy collector panel 20B of FIG. 4 in the shapes of the channels 35 and in the shapes of the fins 61 and 62. With respect to the shapes of the channels 35, the relation of the convex interface surface 15 with respect to the concave interface surface 13 is changed so as to reduce the amount of metal between adjacent channels 35 and therefore reduce the cost of the extrusion 60 and the weight thereof. The convex interface surface 15 is confined by the focal point curve 14 as discussed above in connection with FIG. 6 so that efficient operation is also obtained in the radiant energy collector panel 20D. The particular shapes of the fins 61 and 62 in the panel 20D provide for maximum efficiency in the circulation of the heat absorbing fluid and the absorption of heat therefrom by the fluid. It is drawn to approximately 5 times the real life size.

Figure 8:
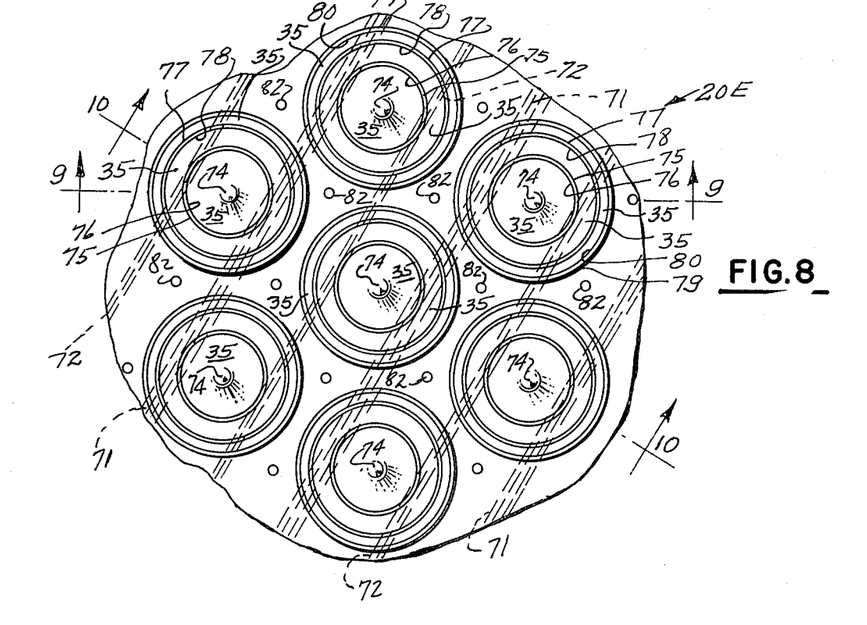
FIG. 8 is a plan view of a further form of the radiant energy collector panel utilizing curved channels as distinguished from linear channels as disclosed in the forms of the invention illustrated by FIGS. 2 to 5 and 7.
Figure 9:
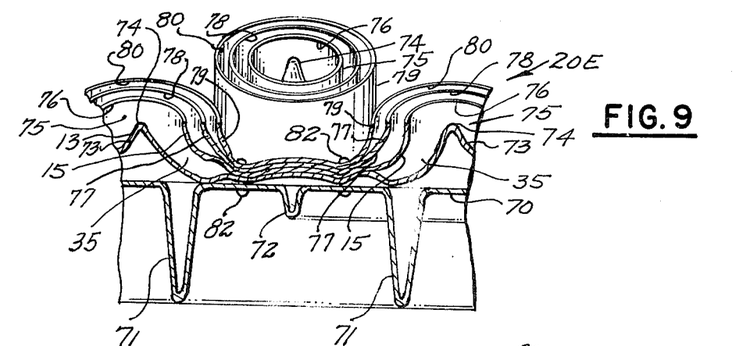
FIG. 9 is a sectional view partly in perspective through the radiant energy collector panel of FIG. 8 and taken substantially along the line 9—9 of FIG. 8.
Figure 10:
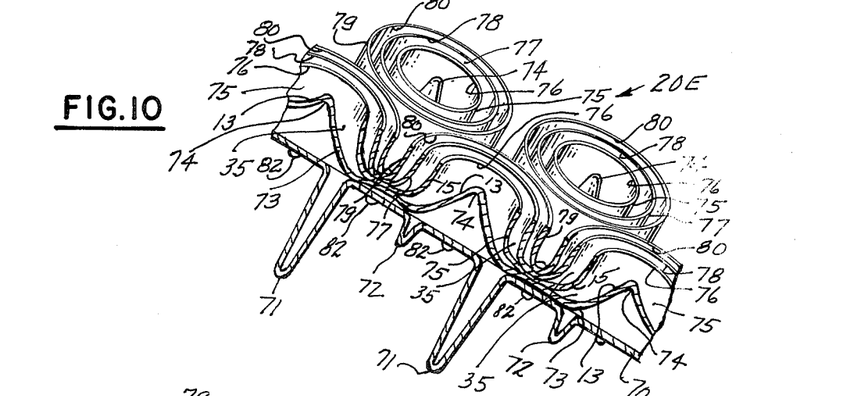
FIG. 10 is a sectional view partly in perspective through the radiant energy collector panel of FIG. 8 and taken substantially along the line 10—10 of FIG. 8.

A further form of the radiant energy collector panel of this invention is generally designated at 20E in FIGS. 8 to 10. Here, however, the channels 35 having the concave interface surfaces 13 and the convex interface surfaces 15 are curved rather than linear as in the previously mentioned collector panels. Also, the curved channels 35 are arranged in channel groups which in turn are laterally arranged in the panel. The panel 20E comprises a plurality of prefabricated sheets which are secured together to provide the curved channels. The prefabricated sheets are preferably formed of initially flat sheet metal and are prefabricated into desired configurations by punching, forming, drawing and the like, which are relatively inexpensive operations providing for inexpensive manufacture and rugged construction. Very thin metal sheets of a few thousandths of an inch can be used here that can be surface pretreated for additional economy and weight reduction.

The radiant energy collector panel 20E includes an inner sheet 70 having a plurality of inwardly facing heat radiating fins 71 and 72 formed therein and arranged substantially in parallel. Overlying the inner sheet 70 is a sheet 73 having a plurality of spaced apart curved surfaces, each merging into a central peak 74, the outer faces of said curved surfaces forming concave interface surfaces 13 which are curved about the central peak 74. Overlying the sheet 73 is another sheet 75 provided with a plurality of openings 76 which are substantially concentric with the central peaks 74 of sheet 73. The sheet 75 has curved portions merging with the openings 76 therein to provide convex interface surfaces 15 spaced from the concave interface surfaces 13 of sheet 73 to provide the curved channels 35 therebetween which are open at the outer face of the panel 20E and which receive the radiant energy applied to the panel. The interface surfaces 13 and 15 of the channels 35 are also joined at their ends and while the channels 35 of the panel 20E are curved instead of linear as in the aforementioned panels, they have the same general cross-sectional configuration and operate in substantially the same way as the channels 35 of the various panels discussed above.

A prefabricated sheet 77 provided with a plurality of openings 78 overlies the sheet 75 and the openings 78 are substantially concentric with the openings 76 in the sheet 75 and the peaks 74 in the sheet 73. The sheet 77 has curved portions merging with the openings 78 to provide convex interface surfaces 15 which are spaced from the concave intervace surfaces 13 formed by the opposite sides of the curved portions of the sheet 75 forming the convex interface surfaces 15 of the sheet 75. The convex interface surfaces of the sheet 77 and the concave interface surfaces 13 of the sheet 77 form additional channels 3 therebetween which are closed at their inner ends and which are open outwardly at the outer surface of the panel 20E also to receive radiant energy directed at the outer face of the panel. These additional channels 35 between the sheets 75 and 77 again have the same general cross-sectional configuration and operate in substantially the same way as the channels 35 discussed above.

Overlying the sheet 77 is another sheet 79 having a plurality of openings 80 which are substantially concentric with the openings 78 and 76 in the sheets 77 and 75 and the peak 74 in the sheet 73. The sheet 79 has a curved portion merging with the openings 80 to provide convex interface surfaces 15 which are spaced from the concave interface surfaces 13 formed by the opposite sides of the curved portions of the sheet 77 forming the convex interface surfaces of the sheet 77. The convex interface surfaces 15 of the sheet 79 and the concave interface surfaces 13 of the sheet 77 form further channels 35 therebetween which are closed at their inner ends and which are open outwardly at the outer surface of the panel 20E also to receive radiant energy directed at the outer face of the panel. These additional channels 35 between the sheets 77 and 79 have the same general cross-sectional configuration and operate in substantially the same way as the channels 35 discussed above. The overlying prefabricated sheets 70, 73, 75, 77 and 79 forming the radiant energy collector panel 20E are secured together in heat transferring relation between the groups of curved channels 35 by rivets or heat transfer tacks 82 wherein the prefabricated sheets engage each other at areas outside of the confines of the groups of channels 35 formed thereby.

Radiant energy received in the outwardly facing open ended curved channels 35 of the panel 20E is converted to heat in the manner described above and the converted heat is absorbed from the sheet 70 and the radiating fins 71 and 72 by a heat absorbing fluid, such as a gas, air or the like, circulating in a heat transferring passage in contact with the sheet and the radiating fins and on the non-irradiated or dark side of the panel as discussed above in connection with the other forms of the invention. The above design may of course also be fitted with conduits by the use of heat conducting clamps or the like for liquid medium heat removal.

While for purposes of illustration several forms of this invention have been disclosed, other forms thereof may become apparent to those skilled in the art upon reference to this disclosure and, accordingly, this invention is to be limited only by the scope of the appended claims.

I claim:

1. A radiant energy collector panel for receiving and absorbing radiant energy and having an outer face, comprising a plurality of outwardly facing open ended channels in the panel which are open at their outer ends, to extend inwardly from the outer face of the panel for receiving radiant energy directed at the outer face of the panel and are closed at their inner ends, each outwardly facing open ended channel comprising an inwardly extending concave interface surface and an opposed inwardly extending convex interface surface spaced from the concave interface surface which are inwardly joined for closing the inner end of the channel, said opposed inwardly extending concave and convex interface surfaces providing increased areas exposed to the radiant energy, absorbing the radiant energy, predominantly reflecting radiant energy of larger angle of incidence inwardly to the inner portion of the channel and thus amplifying the same, predominantly absorbing radiant energy of smaller angle of incidence, and substantially reabsorbing reradiation therefrom of lower spectral energy than the initially impinging radiant energy.

2. A radiant energy collector panel as defined in claim 1 wherein said inwardly extending concave interface surface corresponds substantially to a spiral curve.

3. A radiant energy collector panel as defined in claim 2 wherein said inwardly extending convex interface surface and said inwardly extending concave interface surface are joined at a common point therebetween which is close to the centroid of the spiral curve.

4. A radiant energy collector panel as defined in claim 1 wherein said inwardly extending concave interface surface corresponds substantially to a concave tangential interface curve encompassing a plurality of concave tangential quadrants of conical section curves each having a focal point arranged along a concave focal point curve.

5. A radiant energy collector panel as defined in claim 4 wherein said concave tangential quadrants of conical section curves are substantially quadrants of ellipses.

6. A radiant energy collector panel as defined in claim 4 wherein said opposed inwardly extending convex interface surface corresponds to a convex curve which substantially corresponds to and which is inwardly confined by said concave focal point curve.

7. A radiant energy collector panel as defined in claim 4 wherein said inwardly extending concave interface curve corresponds substantially to a spiral curve, said opposed inwardly extending convex interface surface corresponds to a convex curve which substantially corresponds to and which is inwardly confined by said concave focal point curve, and said inwardly extending convex interface surface and said inwardly extending concave interface surface are joined at a common point thereof which is close to the centroid of the spiral curve.

8. A radiant energy collector panel as defined in claim 1 wherein said open ended channels in said panel are linear and arranged in parallel in said panel.

9. A radiant energy collector panel as defined in claim 8 wherein said panel comprises a plurality of sections fabricated by passing a slightly softened compound through a mold of said section and subsequently permitting same to harden to its desired sectional shape.

10. A radiant energy collector panel as defined in claim 8 wherein said panel comprises a plurality of interconnected preformed strips providing the channels therebetween.

11. A radiant energy collector panel as defined in claim 1 wherein said open ended channels in said panel are curved and arranged laterally in said panel.

12. A radiant energy collector panel as defined in claim 11 wherein said panel comprises a plurality of prefabricated sheets secured together.

13. A radiant energy collector panel as defined in claim 1 wherein said open ended channels in said panel are curved, a plurality of said curved channels are arranged concentrically in a group, and a plurality of said groups of concentrically arranged curved channels are arranged laterally in said panel.

14. A radiant energy collector panel as defined in claim 13 wherein said panel comprises a plurality of prefabricated sheets secured together.

15. A radiant energy collector panel as defined in claim 1 wherein said open ended channels in said panel comprise combinations of channels of different cross sectional shapes arranged in channel groups.

16. A radiant energy collector panel as defined in claim 15 wherein said channels are linear and said channel groups are arranged in parallel in said panel.

17. A radiant energy collector panel as defined in claim 5 wherein said channels are curved and said channel groups are arranged laterally in said panel.

18. A radiant energy collector panel as defined in claim 1 including a radiant energy transmitting cover assembly over the outer face of the panel and the outwardly facing open ended channels therein for transmitting radiant energy to the panel and for protecting the same from the elements.

19. A radiant energy collector panel as defined in claim 18 wherein said cover assembly is closely adjacent the outer face of the panel.

20. A radiant energy collector panel as defined in claim 18 wherein said cover assembly is spaced from the outer face of the panel to provide a gas space therebetween.

21. A radiant energy collector panel as defined in claim 20 including an additional radiant energy transmitting membrane closely adjacent the outer face of the panel to seal the same against foreign matter.

22. A radiant energy collector panel as defined in claim 1 including means for transferring heat generated in the panel by the radiant energy.

23. A radiant energy collector panel as defined in claim 22 wherein said heat transferring means is adjacent the outer face of the panel.

24. A radiant energy collector panel as defined in claim 23 wherein said heat transferring means adjacent the outer face of the panel includes a passage having a circulating heat absorbing fluid therein for absorbing the heat generated in the panel by the radiant energy.

25. A radiant energy collector panel as defined in claim 22 wherein said heat transferring means is adjacent the inner face of the panel.

26. A radiant energy collector panel as defined in claim 25 wherein said heat transferring means is also adjacent the outer face of the panel.

27. A radiant energy collector panel as defined in claim 25 wherein the heat transferring means adjacent the inner face of the panel includes conduits containing a heat absorbing fluid for absorbing the heat generated in the panel by the radiant energy.

28. A radiant energy collector panel as defined in claim 25 wherein the heat transferring means adjacent the inner face of the panel includes fins projecting into a passage containing a heat absorbing fluid for absorbing the heat generated in the panel by the radiant energy.

29. A radiant energy collector panel as defined in claim 28 wherein the side of the passage opposite from the fins projecting therein includes a thermal insulating material for minimizing heat loss therefrom.

30. A radiant energy collector panel as defined in claim 1 including radiant energy absorbing and electrical energy generating means at the inner ends of the channels for generating electrical energy from the radiant energy received in the channels of the panel.

31. A radiant energy collector panel as defined in claim 22 also incuding radiant energy absorbing and electrical energy generating means at the inner ends of the channels for generating electrical energy from the radiant energy received in the channels of the panel.

32. A radiant energy collector panel as defined in claim 30 wherein said opposed inwardly extending concave and convex interface surfaces of said channels are highly reflective for direction the radiant energy onto the radiant energy and electrical energy generating means.

* * * * *